Nov. 27, 1973 E. F. MAGOON ET AL 3,775,488
n-ALKYL ALCOHOL PRODUCTION
Filed June 11, 1969
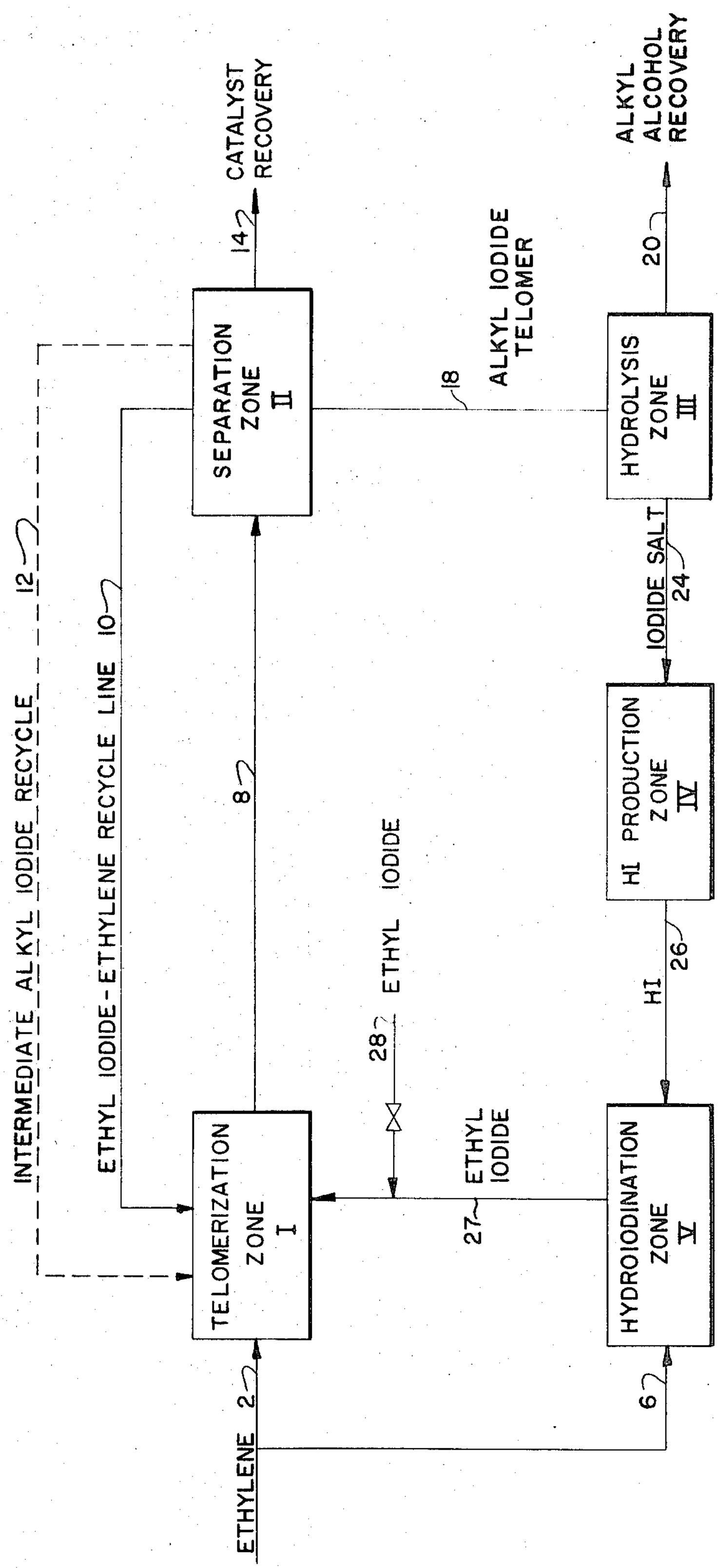

United States Patent Office 3,775,488

Patented Nov. 27, 1973

1

3,775,488 n-ALKYL ALCOHOL PRODUCTION

Eugene F. Magoon, Walnut Creek, and Lynn H. Slaugh, Lafayette, Calif., assignors to Shell Oil Company, New York, N.Y.

Filed June 11, 1969, Ser. No. 832,216

The portion of the term of the patent subsequent to July 13, 1988, has been disclaimed Int. Cl. C07c *31/02, 139/10*

U.S. Cl. 260—640 1 Claim

ABSTRACT OF THE DISCLOSURE

Ethylene is converted to primary n-alkyl alcohols by (1) telomerizing ethylene and ethyl iodide to primary n-alkyl iodides, (2) separating and hydrolyzing the alkyl iodides with an aqueous alkaline solution to produce primary n-alkyl alcohols and an iodide salt, (3) converting the iodide salt to hydrogen iodide and (4) hydroiodinating ethylene with the hydrogen iodide to produce ethyl iodide for recycle to provide the ethyl iodide for telomerization with ethylene.

BACKGROUND OF THE INVENTION

Primary n-alkyl alcohols are compounds of established utility in a variety of applications. Such alcohols, particularly $C_{14}$–$C_{20}$, are converted to n-alkyl sulfates, e.g., as by treatment with sulfuric acid, which are useful as biodegradable detergents. Primary $C_{14}$–$C_{20}$ n-alkyl alcohols are also ethoxylated with ethylene oxide in the presence of a basic catalyst, e.g., sodium hydroxide, to form conventional detergents. Lower molecular weight n-alkyl alcohols, e.g., $C_6$–$C_{10}$, are esterified with polyhydric acids, such as phthalic acid, to form plasticizers for polyvinyl chloride.

It would be useful to prepare primary n-alkyl alcohols by a process which utilizes readily a vailable ethylene as a starting material. Particularly useful would be a process which converts ethylene to primary n-alkyl alcohols of a selected range of carbon atoms.

SUMMARY OF THE INVENTION

It has now been found that primary n-alkyl alcohols can be produced from ethylene in a cyclic-type process which comprises: (1) telomerizing ethylene and ethyl iodide to produce even-carbon-number primary n-alkyl iodide telomers in the presence of iron metal, copper metal, zinc metal, a copper chelate or a $\beta$-dicarbonylic compound monoenolate or a low-valent organometallic compound of a metal of Groups VI–B, VII–B or VIII of the Periodic Table, (2) separting and hydrolyzing the n-alkyl iodide telomers with an alkaline solution to produce primary n-alkyl alcohols and an iodide salt, (3) converting the iodide salt to hydrogen iodide and (4) hydroiodinating ethylene with the hydrogen iodide to produce ethyl iodide for recycle and further telomerization with ethylene.

BRIEF DESCRIPTION OF DRAWING

For a better understanding of the invention, recourse is had to the accompanying drawing wherein the sole figure is a schematic flow diagram showing two modifications of the process of the invention. In the drawing, I designates a telomerization zone, II a separation zone, III a hydrolysis zone, IV a hydrogen iodide production zone and V a hydroiodination zone. For convenience and clarity, apparatus not essential to a complete understanding of the invention such as means for providing heat, refrigeration, stirring, pressure control, cooling, separations and the like have been omitted from the drawing. The selection and location of such means will be apparent to one skilled in this art.

2

With reference to the drawing, one modification of the process may be summarized as follows. The telomerization catalyst, ethyl iodide and reaction diluent are charged to the telomerization reaction zone I, maintained at desired reaction conditions of temperature and pressure. Ethylene is introduced through line 2. The resulting reaction mixture comprising n-alkyl iodide telomers is removed through line 8 to a separation zone II wherein unreacted ethylene and ethyl iodide are separated and recycled through line 10. Any byproducts and catalyst may be removed by line 14. The n-alkyl iodide telomers are passed through line 18 to the hydrolysis zone III wherein the n-alkyl iodide telomers are converted by treatment with an aqueous alkaline solution to produce primary n-alkyl alcohols and an iodide salt solution. The primary n-alkyl alcohols are separated and recovered through line 20 and the iodide salt solution is passed through line 24 to the hydrogen iodide production zone IV wherein the iodide is converted to hydrogen iodide. The hydrogen iodide is passed through line 26 to the hydroiodination zone V wherein it is contacted with ethylene introduced through line 6 to produce ethyl iodide. The resulting ethyl iodide is recycled through line 27 to the telomerization zone. Line 28 is provided for introducing ethyl iodide into the telomerization zone when starting up the process. Once underway, such introduction is stopped, except for any required makeup, and the necessary ethyl iodide reactant is continuously made available from the hydroiodination zone V.

In another modification, which is a preferred modification, the alkyl iodide telomer products from the telomerization zone are separated in the separation zone II into higher alkyl iodide telomer fraction of a selected range of carbon atoms, e.g., $C_{10}$–$C_{20}$, and an intermediate alkyl iodide telomer fraction of carbon atoms up to the lowest carbon number of the higher alkyl iodide fraction. The intermediate alkyl iodide fraction is recycled through line 12 to the telomerization zone for further reaction with ethylene to produce additional higher alkyl iodide products. The higher alkyl iodide fraction is passed through line 18 to the hydrolysis zone III. In this modification, a selected range of higher n-alkyl alcohols, preferably in the $C_{14}$–$C_{20}$ carbon range, is produced from ethylene.

DESCRIPTION OF PREFERRED EMBODIMENTS

Telomerization.—The telomerization of ethylene and ethyl iodide to produce primary alkyl iodide telomers is conducted by contacting ethylene and ethyl iodide in the presence of a catalyst selected from iron metal, copper metal, zinc metal, a copper chelate of a $\beta$-dicarbonylic compound monoenolate, e.g., copper acetylacetonate, and a low valent organometallic compound of a metal of Groups VI–B, VII–B and VIII of the Periodic Table, e.g., chromium, molybdenum, tungsten, manganese, rhenium, iron, ruthenium, osmium, cobalt, rhodium, iridium, nickel, palladium and platinum. Suitable low-valent organometallic compounds of metals of Groups VI–B, VII–B and VIII have at least two ligands independently selected from (i) carbon monoxide, (ii) tertiary organophosphine of from 3 to 60 carbon atoms and (iii) cyclopentadienyl ligand of from 5 to 30 carbons atoms.

The telomerization of alkyl iodides with copper and iron catalyst is described in U.S. Pat. 3,641,170, of Nakamaye et al., common assignee, filed of even date, the telomerization of alkyl iodides with a copper chelate of a $\beta$-dicarbonylic compound monoenolate is described in U.S. Pat. 3,647,171 of Spooncer, common assignee, filed of even date, and the telomerization of alkyl iodides with a low-valent organometallic catalyst of a metal of Groups VI–B, VII–B or VIII is described in applicants' copending application Ser. No. 833,891, filed of even date. The disclosure of these copending applications are herewith incorporated by reference.

The telomerization reaction is conducted in the liquid phase in the presence of a reaction diluent which is liquid at reaction temperature and pressure and is inert to the reactants, catalyst and the products produced therefrom. Suitable diluents are non-hydroxylic diluents such as hydrocarbons free from aliphatic unsaturation e.g., hexane, heptane, octane, decane, dodecane, cyclohexane, tetrahydronaphthalene, benzene, toluene and xylene. Preferred reaction diluents comprise mononuclear aromatic hydrocarbons of from 6 to 12 carbon atoms. Amounts of reaction diluent up to about 30 times the weight of alkyl iodide reactant are typicaly employed.

The telomerization process is conducted by any of a variety of procedures. In one modification, the ethylene, iodide reactant, catalyst and diluent are charged to an autoclave or similar pressure reactor for operation in a batchwise manner. In another modification, the process is effected in a continuous manner as by contacting the entire reaction mixture during passage through a tubular reactor. By any modification, the process is most effectively conducted at elevated temperature and pressure. In general, temperatures varying from about 50° C. to about 250° C. are satisfactory with temperatures from about 75° C. to about 200° C. being preferred. Suitable reaction pressures are those which serve to maintain the reaction mixture substantially in the liquid phase. Reaction pressures from about 10 atmospheres to about 200 atmospheres in general are satisfactory. The telomerization reaction is suitably conducted in an inert reaction environment so that the presence of reactive materials such as water and oxygen is desirably avoided. Reaction conditions are therefore substantially anhydrous and substantially oxygen-free.

Separation zone.—The product mixture from the telomerization zone is passed to the separation zone II. The separation zone II may comprise a suitable fraction distillation unit or similar conventional separation apparatus. Unreacted ethyl iodide and ethylene as well as any recovered catalyst and diluent are recycled to the telomerization zone I. The primary n-alkyl iodide telomer product is separated and passed to the hydrolysis zone III. Alternatively, the alkyl iodide telomers are separated into a higher alkyl iodide telomer fraction of a selected range of carbon atoms and a lower intermediate alkyl iodide fraction, based upon differences in boiling points. The range of carbon atoms of the higher alkyl iodide telomers can be any suitable range desired. Useful ranges of carbon atoms vary from about 2 carbon-numbers, e.g., $C_8$–$C_{10}$, $C_8$–$C_{12}$, $C_8$–$C_{14}$, $C_8$–$C_{16}$, $C_{10}$–$C_{12}$, $C_{10}$–$C_{14}$, $C_{10}$–$C_{16}$, $C_{10}$–$C_{20}$, $C_{12}$–$C_{16}$, $C_{14}$–$C_{20}$, $C_{20}$–$C_{24}$, and the like. The lower alkyl iodide fraction includes fraction $C_4$(n-butyl iodide) up to the carbon number of the highest alkyl iodide in the higher alkyl iodide fraction, but preferably includes only from $C_4$ up to the carbon-number of the lowest alkyl iodide in the higher alkyl iodide fraction.

Alcohol production.—In the hydrolysis zone III the primary n-alkyl iodides are converted to primary n-alkyl alcohols and an iodide salt by hydrolysis of the n-alkyl iodides by conventional methods with an aqueous alkaline solution. Suitable aqueous alkaline solutions generally have a pH of above 7 and preferably the pH varies from about 8 to 13. Illustrative suitable aqueous alkaline solutions are aqueous solutions of monobasic alkali metal salts of carbonic acid such as sodium bicarbonate, alkali metal or alkaline earth metal salts of acetic acid, alkaline earth metal oxides and hydroxides such as magnesium oxide and calcium hydroxides, alkali metal hydroxides such as sodium hydroxide. Sodium bicarbonate solution is a preferred alkaline solution.

The aqueous alkaline solution preferably contains a portion of a polar co-solvent. Suitable polar solvents include ketones such as acetone and methyl ethyl ketone and ethers such as dioxane and tetrahydrofuran. The proportions of water and co-solvent in the alkaline solution varies, by volume, from about 40% co-solvent to 80% co-solvent and from about 20% water to 80% water. Preferably, the proportion of co-solvent and water ranges from about 50–75% co-solvent and 25–50% water. In carrying out the hydrolysis, the aqueous alkaline solution to alkyl iodide weight ratio varies from about 3:1 to 15:1 with a weight ratio of 5:1 to 10:1 being preferred.

Hydrolysis is effected by heating and agitating the mixture of alkyd iodide and aqueous alkaline solution in an autoclave or similar pressure reactor provided with means for heating and agitation, and for controlling temperatures and pressures. Suitable temperatures vary from about 50° to 200° C. and suitable pressures vary from about 100 p.s.i.g. to 1000 p.s.i.g.

Subsequent to the hydrolysis reaction the alcohol products are separated and recovered and the aqueous iodide salt solution is employed for hydrogen iodide production.

Hydrogen iodide production.—The iodide salt solution is converted to hydrogen iodide by any conventional method. In a preferred method, the iodide salt is acidified with a strong inorganic acid such as hydrogen chloride, or phosphoric acid to produce a solution of hydrogen iodide, which is suitably employed, with or without purification or concentration, for reaction with ethylene to produce ethyl iodide. In another method, the iodide salt solution is treated with chlorine to produce iodine which is recovered and reacted with hydrogen to yield hydrogen iodide. In this method, the iodide solution is adjusted to pH in the range of 2 to 5 and heated to a temperature of from about 30°–50° C. Chlorine gas is contacted with heated solution and the resulting iodine product is recovered. The iodine recovered is subsequently reacted with hydrogen in any conventional manner known in the art to form hydrogen iodide.

Hydroiodination.—The preparation of ethyl iodide by the reaction of hydrogen iodide and ethylene in the hydroiodination zone V can be conducted by any more or less conventional method. In one modification, ethylene and hydrogen iodide are contacted in the fluid phase, e.g., liquid or gaseous, in the presence or absence of an inert reaction diluent. In another modification, ethylene and hydrogen iodide are contacted in the presence of a conventional hydrohalogenation catalyst. By any modification, suitable reaction temperatures and pressures vary over a wide range. Temperatures varying from −20° C. to 500° C. and pressures varying from 1 atmosphere to 100 atmospheres are generally satisfactory.

Subsequent to the hydroiodination reaction, the ethyl iodide product is separated by conventional means such as fractional distillation, selective extraction and the like. The ethyl iodide is recycled to the telomerization reactor.

Although it is preferable to carry out the hydroiodination reaction in a separate reaction zone (V), this reaction can be effected within the telomerization zone (I) itself thereby eliminating the requirement of a separate hydroiodination zone. By control of the reaction conditions in the telomerization zone (I) substantially complete reaction of hydrogen iodide with excess ethylene can be caused to take place with no detrimental effect on the telomerization reaction.

EXAMPLE I

The telomerization of ethylene with ethyl iodide in the presence of bis(triphenylphosphine)tricarbonylruthenium as catalyst in benzene solvent is conducted in an autoclave designated in the drawing as telomerization zone I. Catalyst to ethyl iodide molar ratio of 1:40 and ethylene to ethyl iodide molar ratio of 20:1 are employed. The autoclave is maintained at a temperature of 150° C. and a pressure of 1000–1500 p.s.i.g. The alkyl iodide components of the resulting product mixture comprise 22 mole percent unreacted ethyl iodide, 20 mole percent n-butyl iodide, 20 mole percent n-hexyl iodide, 15 mole percent n-octyl iodide, 10 mole percent n-decyliodide, 6 mole percent n-dodecyl iodide, 4 mole percent n-tetradecyl iodide, 2 mole percent n-hexadecyl iodide and 1 mole percent n-octadecyl iodide.

The product mixture is withdrawn and the ethylene, catalyst, benzene and $C_2$ to $C_{10}$ n-alkyl iodide products are separated and recycled to the telomerization. The $C_{12}$ to $C_{18}$ n-alkyl iodide telomer products are treated with 10% wt. calcium hydroxide in acetone/water solution at a temperature of 100° C. for several hours in an autoclave, designated as the hydrolysis zone III. The resulting $C_{12}$–$C_{18}$ primary n-alkyl alcohols are separated from the aqueous iodide salt solution and removed as products.

The aqueous iodide solution is treated with 6 N hydrochloric acid to produce an aqueous hydrogen iodide solution. The hydrogen iodide solution is then contacted with excess ethylene in an autoclave, designated in the drawing as the hydroiodination zone V, which is maintained at 100–150° C. The resulting ethyl iodide product and unreacted ethylene are separated and utilized for recycle to the telomerization zone I.

EXAMPLE II

The telomerization of ethylene with n-butyl iodide and n-hexyl iodide was conducted in the presence of bis(triphenylphosphine)tricarbonylruthenium as catalyst. Each reaction was conducted with 0.5 millimole of the catalyst, 20 millimoles of the indicated alkyl iodide, 30 ml. of benzene and at an initial ethylene pressure of 800 p.s.i.g. and at a temperature of 125° C. The reaction conditions and results are provided in Table I.

TABLE I

| | Run | |
|---|---|---|
| | 1 | 2 |
| Alkyl iodide reactant | n-Butyl | n-Hexyl |
| Conversion of alkyl iodide, percent | 58 | 33 |
| Product selectivity, mole percent: | | |
| n-Hexyl iodide | 40 | |
| n-Octyl iodide | 26 | 53 |
| n-Decyl iodide | 16 | 30 |
| n-Dodecyl iodide | 10 | 14 |
| n-Tetradecyl iodide | 6 | 4 |

We claim as our invention:

1. A process of converting ethylene to primary n-alkyl alcohols by:

(1) telomerizing in a first reaction zone ethylene and ethyl iodide to a mixture of even-carbon-number primary n-alkyl iodide telomers in the presence of an iron metal catalyst in the liquid phase in a hydrocarbon free from aliphatic unsaturation, under substantially anhydrous and oxygen-free conditions, under a pressure of about 10 atmospheres to about 200 atmospheres, and at a temperature of about 50° C. to about 250° C.;

(2) separating by fractional distillation the mixture of alkyl iodide telomers into a higher alkyl iodide telomer fraction and a lower intermediate alkyl iodide telomer fraction;

(3) returning the intermediate alkyl iodide telomer fraction to the first reaction zone for further telomerization with ethylene;

(4) reacting the higher alkyl iodide telomer fraction with an aqueous alkaline solution to produce a primary n-alkyl alcohol product and an iodide salt;

(5) converting the iodide salt to hydrogen iodide; and (6) hydroiodinating ethylene with said hydrogen iodide in the presence of a conventional hydrohalogenation catalyst to produce ethyl iodide and recycling it to the first reaction zone for further telomerization.

References Cited

UNITED STATES PATENTS

| | | | |
|---|---|---|---|
| 3,592,866 | 7/1971 | Magoon et al. | 260—658 C |
| 3,641,170 | 2/1972 | Nakamaye et al. | 260—658 C |
| 3,641,171 | 2/1972 | Spooncer | 260—658 C |
| 2,434,289 | 1/1948 | Schmerling | 260—658 C |
| 2,771,496 | 11/1956 | Hervert | 260—658 C |
| 2,419,500 | 4/1947 | Peterson et al. | 260—640 |
| 2,016,072 | 10/1935 | Calcott et al. | 260—663 |
| 2,284,467 | 5/1942 | Ballard | 260—663 |
| 2,572,251 | 10/1951 | Benedictis et al. | 260—640 |
| 2,819,319 | 1/1958 | Barnes | 260—640 |

FOREIGN PATENTS

| | | | |
|---|---|---|---|
| 1,418,479 | 10/1965 | France | 260—640 |
| 803,463 | 10/1958 | Great Britain | 260—658 C |

OTHER REFERENCES

Gilman: "Organic Chemistry" (1953), pp. 1043–51.

Mellor: "A Comprehensive Treatise on Inorganic and Theoretical Chemistry," vol II, 1922, pp. 170, 171, QD31M4 Supplement, p. 857, 1956.

Sneed et al.: "Comprehensive Inorganic Chemistry," 1954, pp. 120, 121, QD151566.

Jacobson: "Encyclopedia of Chemical Reactions," vol. V (1953), QD75J3, pp. 532, 534.

LEON ZITVER, Primary Examiner

J. E. EVANS, Assistant Examiner

U.S. Cl. X.R.

260—658 C, 663